US009825883B2

(12) United States Patent
Nichols et al.

(10) Patent No.: US 9,825,883 B2
(45) Date of Patent: Nov. 21, 2017

(54) EXTENSIBLE TIME SPACE SWITCH SYSTEMS AND METHODS

(75) Inventors: Jeffery Thomas Nichols, Marietta, GA (US); Ian Dublin, Nepean (CA); Peter Bengough, Kanata (CA); Andre Sabourin, Kanata (CA)

(73) Assignee: Ciena Corporation, Hanover, MD (US)

( * ) Notice: Subject to any disclaimer, the term of this patent is extended or adjusted under 35 U.S.C. 154(b) by 874 days.

(21) Appl. No.: 12/788,453

(22) Filed: May 27, 2010

(65) Prior Publication Data

US 2011/0292932 A1    Dec. 1, 2011

(51) Int. Cl.
*H04Q 11/00*    (2006.01)
*H04L 12/933*   (2013.01)
*H04L 12/931*   (2013.01)

(52) U.S. Cl.
CPC ............ *H04L 49/103* (2013.01); *H04L 49/00* (2013.01); *H04L 49/45* (2013.01); *H04Q 2213/13393* (2013.01)

(58) Field of Classification Search
None
See application file for complete search history.

(56) References Cited

U.S. PATENT DOCUMENTS

| | | | | |
|---|---|---|---|---|
| 4,154,982 A * | 5/1979 | Charransol | ............ | H04Q 11/08 370/369 |
| 4,323,984 A * | 4/1982 | Ishihara | ............ | G02F 1/09 359/107 |
| 4,556,970 A * | 12/1985 | Flanagin | ............ | H04J 3/0682 370/422 |
| 4,628,502 A * | 12/1986 | Boulard | ............ | H04Q 11/04 370/373 |
| 5,617,414 A * | 4/1997 | Bergkvist | ............ | H04Q 11/08 370/374 |
| 5,742,605 A * | 4/1998 | Norman, Jr. | ............ | H04J 3/085 370/405 |
| 5,978,370 A * | 11/1999 | Shively | ............ | H04B 7/18515 370/370 |
| 6,226,288 B1 * | 5/2001 | Allen | ............ | H04Q 11/04 370/362 |

(Continued)

*Primary Examiner* — Christopher Wyllie
(74) *Attorney, Agent, or Firm* — Clements Bernard Walker PLLC; Christopher L. Bernard; Lawrence A. Baratta, Jr.

(57) ABSTRACT

The present disclosure provides a structured, pipelined large time-space switch and method of operation resolving interconnect complexity. The time-space switch results in an interconnect complexity that does not grow as the spatial dimension is increased and results in a reduction of long high fan-out nets, a quicker layout, and improved clock speed. With respect to time-space switch fabric implementation, the present invention improves the maximum clock frequency of the switch fabric, and improves integrated circuit layout time by eliminating long high fan-out nets. Certain high-speed large switch fabrics may not be realizable without this implementation, and it significantly reduces implementation time (and cost). The present invention may include link encoding of switch frames by mapping 8B10B control characters into an 64B65B format (similar to Generic Framing Protocol-Transparent (GFP-T)), wrapping 32 65B encoded words with an 11-bit error correcting code, and scrambling the frame with a frame synchronous scrambler.

12 Claims, 9 Drawing Sheets

(56) References Cited

U.S. PATENT DOCUMENTS

| | | | |
|---|---|---|---|
| 6,366,579 B1 | 4/2002 | Lindberg | |
| 6,628,650 B1 * | 9/2003 | Saito | H04L 12/5601 370/369 |
| 6,693,902 B1 * | 2/2004 | Sahlman | H04L 12/52 370/369 |
| 6,704,307 B1 | 3/2004 | Graves et al. | |
| 6,834,049 B1 | 12/2004 | Tomar et al. | |
| 6,931,002 B1 * | 8/2005 | Simpkins | H04L 12/6402 370/354 |
| 6,970,455 B2 | 11/2005 | Garg et al. | |
| 7,039,072 B1 | 5/2006 | Shivji et al. | |
| 7,177,328 B2 * | 2/2007 | Miller | H04J 3/0623 370/503 |
| 7,394,806 B2 * | 7/2008 | Beshai | H04Q 11/0005 370/380 |
| 7,760,716 B2 * | 7/2010 | Beshai | H04L 49/15 370/380 |
| 8,830,993 B1 * | 9/2014 | Dublin | H04L 49/45 370/369 |
| 2002/0093952 A1 * | 7/2002 | Gonda | H04Q 3/68 370/369 |
| 2002/0181482 A1 * | 12/2002 | Dally | H04Q 3/521 370/412 |
| 2002/0191588 A1 * | 12/2002 | Personick | H04L 12/6402 370/352 |
| 2003/0112831 A1 * | 6/2003 | Williams | H04Q 11/06 370/535 |
| 2004/0100994 A1 * | 5/2004 | Miller | H04J 3/0623 370/503 |
| 2004/0190503 A1 * | 9/2004 | Bansal | H04Q 3/68 370/369 |
| 2006/0262780 A1 * | 11/2006 | Robinson | H04L 12/66 370/376 |
| 2007/0030845 A1 * | 2/2007 | Hill | H04L 49/253 370/369 |
| 2011/0292932 A1 * | 12/2011 | Nichols | H04L 49/45 370/376 |

* cited by examiner

EXTENSIBLE TIME SPACE SWITCH SYSTEMS AND METHODS

FIELD OF THE INVENTION

The present invention relates generally to switching systems and methods. More particularly, the present invention relates to extensible time space switch systems and methods utilizing a structure and a pipeline to resolve interconnect complexity for a timeslot switch providing interconnect complexity that does not grow as spatial dimension is increased and resulting in a reduction of long high fan-out nets.

BACKGROUND OF THE INVENTION

A time-space switch has N input links of time-division multiplexed (TDM) data divided into M timeslots. Each of the N output links can select any of the M timeslots from any of the N input links. Each output pair $(m_{out}, n_{out})$ can select from any of the input pairs $(m_{in}, n_{in})$ without blocking. The capacity (or throughput) of a time-space switch is a function of (a) the number of links, N, and (b) the throughput (or bit rate) of each link. As the capacity of networks increase, so do the requirements of the switching equipment used in these networks. By consequence, the trend in switching equipment is towards systems that support higher link rates, as well as a larger number of links. The techniques and methods used to implement these systems need to accommodate scalability accordingly. In today's electronic systems it is common to transfer digital data between components using high speed serial (HSS) links. In order for these high speed serial links to be reliable, a physical layer encoding scheme is typically required. Physical layer encoding is required to ensure sufficient transition density and DC balance for receivers to recover the signal. Encoding may also be required to correct for errors introduced in transmission. Physical layer encoding addresses these issues by transforming the transmitted data in a systematic fashion and, as necessary, adding a specified amount of redundancy. With prior knowledge of the encoding scheme used at the transmitter, the receiver can make use of this information to improve the integrity of the received data. However, a fundamental tradeoff exists between maximizing the degree of improved reliability, while minimizing the amount of additional overhead (redundancy) that is added at the transmitter.

In the present state of the art, there is a lack of a unified encoding standard that is universal in switch system applications. The most common standard encoding scheme used for serial links that are driven across system backplanes is 8B/10B. With this scheme, the serial transmit data is transformed into a sequence of discrete control characters and data characters. Special control characters are used to delineate the start and end of packets, and the idle regions between packets. The interface to a time-space switch may also use the control characters to delineate and synchronize switch frames launched into the switch fabric. The 8B/10B protocol is engineered to offer good transition density and DC balance, albeit at the expense of an additional 25% of overhead (since 2 bits are added to every 8-bit input character to derive a 10-bit output character). Furthermore, the 8B/10B does not offer any error correction capacity, which has become a requirement for reliable data integrity as link speeds increase. As such, additional overhead is required on top of 8B/10B to add Forward Error Correction (FEC).

Once the framed serial data is reliably received, a simple timeslot interchanger (TSI) switch can be implemented by writing timeslot values into a Random Access Memory (RAM) and then reading output values in a new order. Other methods include writing the timeslot data into registers and using multiplexers to select the order of the output timeslots. Adding more input and output links introduces a spatial dimension to the timeslot interchanger and results in a time-space switch. Each output link may select any timeslot from any input link for each output timeslot. However, interconnect complexity increases exponentially as the spatial dimension grows, resulting in long high fan-out nets which make it difficult to route and meet the high-speed timing constraints. By consequence, traditional implementation methods break down as the size of the switch grows, and alternative techniques are required to achieve the necessary scalability for today's systems.

BRIEF SUMMARY OF THE INVENTION

In an exemplary embodiment, a pipelined time-space switch includes input circuitry including N links each receiving M timeslots; a two-dimensional matrix of a plurality of individual timeslot interchangers, wherein the two-dimensional matrix is configured to receive from the input circuitry each of the M timeslots from the N links in a pipelined manner; and output circuitry including N links configured to receive any of the M timeslots from any of the N links from the two-dimensional matrix. The pipelined manner includes each of the plurality of individual timeslot interchangers interconnected to adjacent neighbors only thereby providing interconnect complexity that does not grow as spatial dimension is increased and resulting in a reduction of long high fan-out nets. Input data from the input circuitry is substantially orthogonal to the output circuitry and each of the input circuitry and the output circuitry are adjacent to the two-dimensional matrix. Input data flows from the input circuitry orthogonal to the output circuitry, and wherein output data and control flows to the output circuitry orthogonal to the input circuitry. The pipelined time-space switch further includes configuration memory for each of the N links, wherein the configuration memory is configured to control the data flow to the output circuitry. The input circuitry includes input framers for each of the N links; and wherein the output circuitry includes output framers for each of the N links. The input framers and the output framers utilize efficient line coding relative to 8B10B, comprising of SLP112 timeslot data framing, 64B65B encoding, Fire code forward error correction, and scrambling. Each of the plurality of individual timeslot interchangers includes a 8×8 link cascadable time-space switch. The pipelined time-space switch is used in the system as either an ingress switch, a center stage switch, or an egress switch.

In another exemplary embodiment, a pipelined time-space switch includes input circuitry including N links each receiving M timeslots; a two-dimensional matrix of a plurality of time-space switches, wherein the two-dimensional matrix is configured to receive from the input circuitry each of the M timeslots from the N links in a pipelined manner; and output circuitry including N links configured to receive any of the M timeslots from any of the N links from the two-dimensional matrix. The pipelined manner includes each of the plurality of time-space switches interconnected to adjacent neighbors only thereby providing interconnect complexity that does not grow as spatial dimension is increased and resulting in a reduction of long high fan-out nets. Each of the plurality of time-space switches includes a memory tile configured to operate as an 8×8 time-space switch. The pipelined time-space switch includes $N^2$ of the memory tiles interconnected in the pipelined manner thereby providing an overall 8N×8N link time-space switch, where N is an integer. Input data from the input circuitry is substantially orthogonal to the output circuitry and each of the input circuitry and the output circuitry are adjacent to the two-dimensional matrix. Input data flows from the input circuitry orthogonal to the output circuitry, and wherein output data and control flows to the output circuitry orthogonal to the input circuitry. The pipelined time-space switch further includes configuration memory for each of the N links, wherein the configuration memory is configured to control the data flow to the output circuitry. The input circuitry includes input framers for each of the N links; wherein the output circuitry includes output framers for each of the N links; and wherein the input framers and the output framers utilize efficient line coding relative to 8B10B, comprising of SLP112 timeslot data framing, 64B65B encoding, Fire code forward error correction, and scrambling. The pipelined time-space switch is used in the system as either an ingress switch, a center stage switch, or an egress switch.

In yet another exemplary embodiment, a pipelined time-space switching method includes receiving M timeslots over each of N links; loading each of the M timeslots for each of the N links in a two-dimensional matrix in a pipelined fashion; and reading out any of the M timeslots from any of the N links from the two-dimensional matrix. The pipelined fashion includes interconnection within the two-dimensional matrix such that interconnections are only between adjacent neighbors only thereby providing interconnect complexity that does not grow as spatial dimension is increased and resulting in a reduction of long high fan-out nets.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides a structured, pipelined large time-space switch and method of operation resolving interconnect complexity. The present invention results in an interconnect complexity that does not grow as the spatial dimension is increased and results in a reduction of long high fan-out nets, a quicker layout, and improved clock speed. The present invention may include link encoding of switch frames by mapping 8B10B control characters into an 64B65B format (similar to Generic Framing Protocol-Transparent (GFP-T)), wrapping 32 65B encoded words with an 11-bit error correcting code, and scrambling the frame with a frame synchronous scrambler. The present invention improves the bandwidth efficiency of the link encoding across the backplane and only requires a 3.125% increase in frequency (where 8B10B encoding requires a 25% frequency increase). Furthermore, the use of 64B65B link encoding (similar to GFP-T encoding) allows any character to be sent as a control character. The Switch Link Protocol uses control characters inside the switch frame for 'byte-stuffing' and framing within a timeslot. The 64B65B encoding used for 10 GbE does not allow control characters inside a packet. Using the present invention, the switch frame can maintain the framing for the collection of timeslots while allowing each timeslot to have its own framing. The link encoding uses a truncated pseudo-random-bit-sequence with a seed value chosen to balance 1's and 0's and to eliminate trouble patterns. Using a frame synchronous truncated PRBS pattern eliminates the error propagation issues encounters when using a self-synchronous scrambler. The link encoding also incorporates a Fire code that is capable of correcting an error burst of up to 11 bits for each 2112-bit FEC frame. With respect to the time-space switch fabric implementation, the present invention improves the maximum clock frequency of the switch fabric, and improves IC layout time by eliminating long high fan-out nets. Certain high-speed large switch fabrics may not be realizable without this implementation, and it significantly reduces implementation time (and cost).

Figure 1:
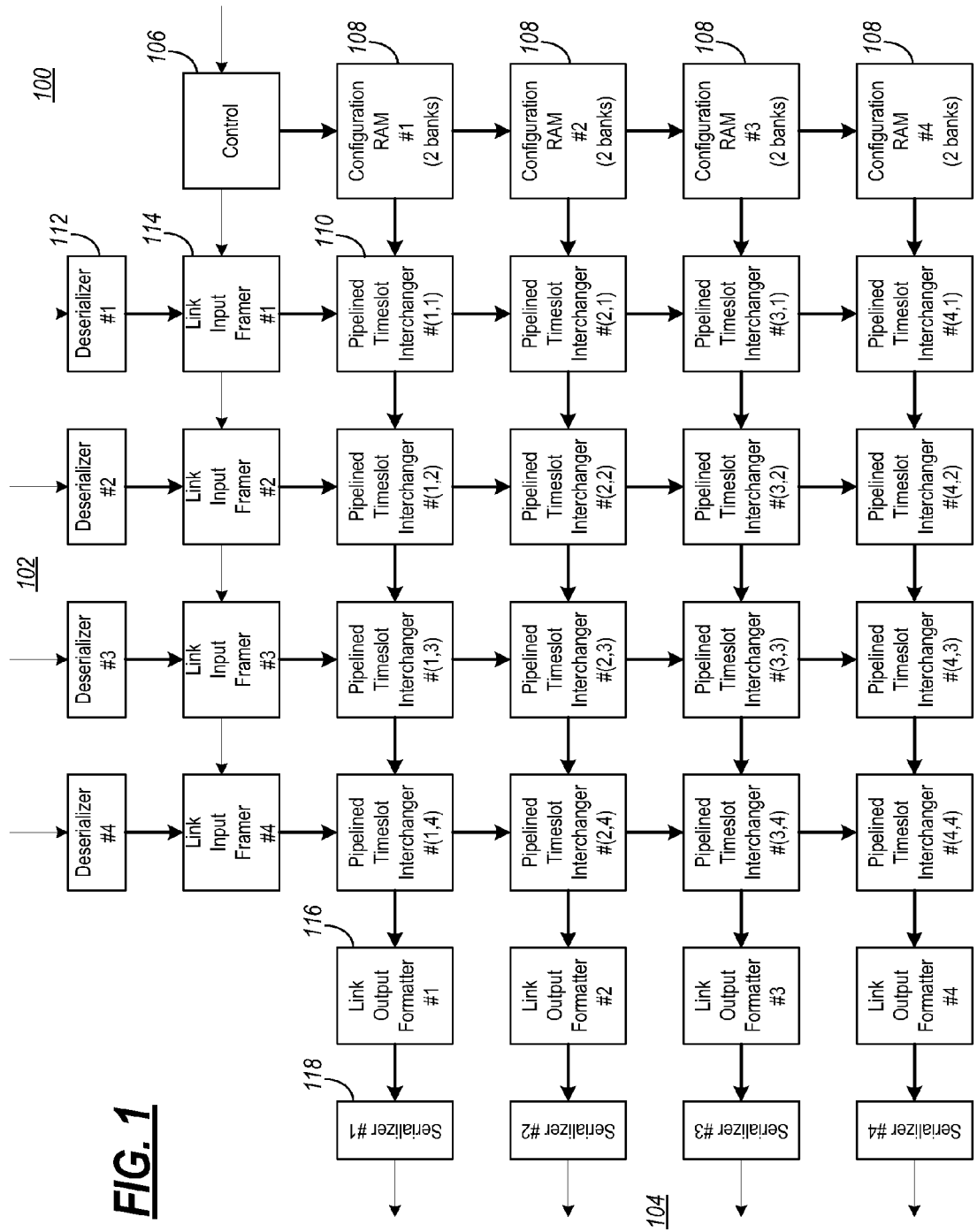
FIG. 1 is a functional block diagram of a switch matrix of the present invention with serial input links at the top of the switch matrix, serial output links on the left side of the switch matrix, and control and configuration RAMs on the right side of the switch matrix.

Referring to FIG. 1, in an exemplary embodiment, a functional block diagram illustrates a switch matrix 100 of the present invention with serial input links 102 at the top of the switch matrix 100, serial output links 104 on the left side of the switch matrix 100, and control 106 and configuration RAMs 108 on the right side of the switch matrix 100. Timeslot data from the input links 102 flows from top to bottom and is pipelined between each of a plurality of pipelined timeslot interchangers 110 (labeled as #(n, m) where n=1 to 4, m=1 to 4). The configuration RAMs 108 are located on the right of the switch matrix and each of the configuration RAMs 108 contains an input to output timeslot mapping for each output link 104. There are two banks of configuration memory in the configuration RAMs 108 to support hitless switching. Each of the input links 102 connect to a deserializer 112 and receive a formatted bit stream with timeslot data for each of M timeslots. The deserializers 112 connect to input link framers 114 that find the start of the switch frame and align the switch frames for all links to the first timeslot. Once the frames are aligned, the Control 106 block issues a launch signal to Link Input Framer 114 number 1 and the framer 114 begins writing the first timeslot into Pipelined Timeslot Interchanger (1, 1). One clock cycle later, the launch signal driving Link Input Framer number 2 is asserted and the framer writes the first timeslot for link number 2 into Pipelined Timeslot Interchanger (1, 2). On the same clock cycle, the second timeslot is written Pipelined Timeslot Interchanger (1, 1) while the first timeslot for Link number 1 is being written to Pipelined Timeslot Interchanger (2, 1). This process continues until the write bank of all of the Timeslot Interchangers 110 has been written with the appropriate input link's 102 timeslot data. Note that all of the timeslot interchangers 110 for a given column contain the timeslot data for the same link.

For each output timeslot, the configuration RAM 108 supplies the input link 102 and timeslot for the output link 104. The timeslot mapping address flows from right to left and is pipelined at the output of every stage of the Timeslot Interchanger 110. In addition, a data pipeline register is placed at the output of each pipelined Timeslot Interchanger 110. Depending upon the link address, each pipelined Timeslot Interchanger 110 will either forward the data from the previous stage or read the timeslot data from the Timeslot Interchanger 110 memory. When the Control 106 block issues the switch frame launch, the address of the first timeslot is presented to Configuration RAM #1 108. The configuration RAM 108 looks up the input timeslot and link for the first output timeslot on link number 1 and presents the address to Pipelined Timeslot Interchanger (1, 1). If the output timeslot address is for link number 1, then the timeslot interchanger 110 reads the timeslot data and forwards the data to the next stage. Otherwise, Pipelined Timeslot Interchanger (1, 1) will forward NULL characters. One clock cycle later, the address of the first output timeslot is presented to Configuration RAM #2 108. The configuration RAM 108 looks up the input timeslot and link for the first output timeslot on link number 1 and presents the address to Pipelined Timeslot Interchanger (2, 1). If the output timeslot address is for link number 1, then the timeslot interchanger 110 reads the timeslot data and forwards the data to the next stage. On the same clock cycle, the Configuration RAM #1 108 is supplying the address of the second timeslot to Pipelined Timeslot Interchanger (1, 1) and Pipelined Timeslot Interchanger (1, 2) is getting the address of the first timeslot from the adjacent block. The process continues until each output link formatter 116 receives all of its timeslot data as programmed in the Configuration RAM 108. The output link formatters 116 connect to serializers 118 which provide the output links 104.

In the switch matrix 100, there are N links each with M timeslots that are input from the framers 114 to the pipelined timeslot interchangers 110. In an exemplary embodiment, there are 112 timeslots which can support a switching granularity of over 50 Mbps per timeslot in switch matrix 100 that has a capacity of over 180 Gbps. In one exemplary aspect of the present invention, the architecture of the switch matrix 100 is such that interconnects are vastly reduced. In particular, pipelining of the timeslot interchangers 110 enables each of the timeslot interchangers 110 to only connect to its adjacent neighbors. For example, there is no direct connection between Pipelined Timeslot Interchanger (1, 1) and Pipelined Timeslot Interchanger (4, 4). In operation, the switch matrix 100 requires each of the M timeslots from each of the N links to be available to each of the serial output links 104. As such, the pipelining of the timeslot interchangers 110 includes filling each of the timeslot interchangers 110 with each of the M timeslots from the N links. In FIG. 1, this is accomplished by starting at the Pipelined Timeslot Interchanger (1, 1) and flowing downwards and leftwards on a clock cycle basis such that each of the M timeslots from the N links is written downwards and leftwards to adjacent timeslot interchangers 110. Thus, each output link formatter 116 has available to it each of the M timeslots from the N links.

The switch matrix 100 may be implemented or realized with any of a general purpose processor or collection of processors, a content addressable memory, a digital signal processor (DSP), an application specific integrated circuit (ASIC), a field programmable gate array (FPGA), any suitable programmable logic device (PLD), discrete gate or transistor logic, discrete hardware components, or any combination thereof, designed to perform the functions described herein. There are numerous alternate exemplary embodiments of the present invention. One approach may be to use a 8×8 link cascadable time-space switch as a building block for each timeslot interchanger 110. Each pipelined timeslot interchanger 110 in the switch matrix 100 would then be a 2×2 switch and would support two input links and two output links. This would half the number of pipeline stages required. Another approach may be to accept a modest amount of interconnect complexity and build each pipelined node in the switch using smaller time-space switches.

Figure 2:
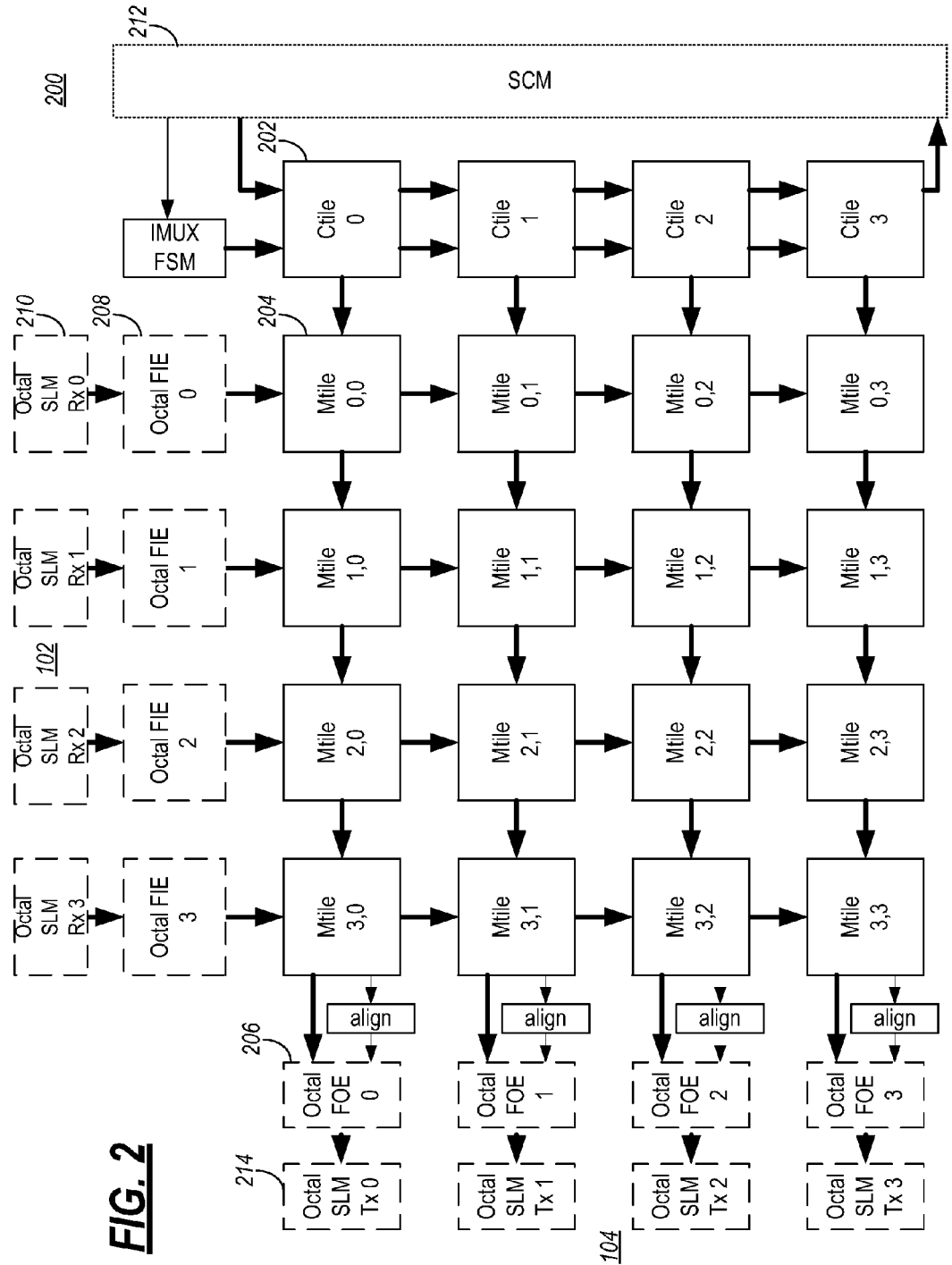
FIG. 2 is a diagram of a switch engine as a two dimensional matrix of smaller time-space switches with a 8×8 link cascadable time-space switch as a building block for each timeslot interchanger.

Referring to FIG. 2, in an exemplary embodiment, a switch engine 200 illustrates a two dimensional matrix of smaller time-space switches with a 8×8 link cascadable time-space switch as a building block for each timeslot interchanger 110. The switch engine 200 is configured to store 112 36-bit values from each of the 32 input links 102; read, write, and store the switch configuration in the configuration RAMs 108; and select any of the 3584 36-bit timeslot values for each of the 32 output links 104; The switch engine 200 includes four configuration tiles (CTiles) 202 and sixteen memory tiles (MTiles) 204. Each CTile 202 has eight configuration memories (CMEM) and maintains two banks of the input to output timeslot mapping for an Octal Frame Output Engine (FOE) block 206. Each MTile 204 has eight data memories divided into two banks; one bank is used for writing the current Extended Time Slot Group (ETSG) while the other bank is used to read the previous ETSG. Each MTile 204 is effectively an 8×8 link cascadable time-space switch. Each Octal Frame Input Engine (FIE) 208 block transmits the ETSG data from eight input links (Octal Serial Link Modules (SLM) 210) to a column of four MTiles 204. The Octal FOE 206 receives ETSG data from a row of MTiles 204. The data is pipelined between the MTiles 204 to reduce fan-out and long nets. Each Link is synchronized to write timeslot data at the same time. The FIEs 208 send data continuously from start of frame until all 12 ETSG have been sent. Each of the MTiles 204 includes enough storage to store two banks of 112 Time Slots from the four input links 102. The MTile 204 memory is organized as two blocks or banks, each of which can store a complete set of ETSG. At any one time one of these blocks is being written with new ETSG data while the other block is being read. At each ETSG boundary the blocks switch roles. Each input link 104 sends one 36-bit word every other clock cycle. Even and odd link pairs are multiplexed into a single data stream which is written into one of the write ports of a bankram (illustrated in FIG. 4).

The serial link modules (SLM) 210 are HSS (High Speed Serial) octal receiver modules, HSS octal transmitter module, and glue logic to interface to the FIEs 208, FOEs 206, and a Switch Control and Maintenance Block (SCM) 212. The SLMs 210 include eight receiver SERDES blocks and eight transmitter SERDES blocks, asynchronous First-In-First-Out buffers (FIFOs) are used to cross from the core clock domain to each serial link HSS interface clock domain. (32 receive and 32 transmit clock domains). The SERDES is configured to support a 6.25 Gbps serial data stream. The FIE 208 support a Switch Link Protocol (SLP112) switch frame format, perform word alignment, perform 64B/65B Decoding for SLP112 links, perform Fire Code Decoding and Burst Error Correction, detect and mark control character bytes, receive and buffer the incoming data to accommodate switch frame skew, calculate the switch frame cyclic redundancy check (CRC) and verify it with subsequent CRC byte, and extract the Configuration Table Select (CTS) Bytes through majority voting.

The SCM 212 contains the switch control logic and maintenance control logic, including the processor interface. The Switch Control sub-block contains the logic associated with the following functions: Generating control signals for controlling the flow of data across the FIE 208, switch engine 200, and FOE 206; Initiating switch frame generation based on external switch frame launch or Enhanced Autolaunch; Polling for CTS state at each input link and controlling Configuration RAM bank selection in the switch engine 200. The Maintenance sub-block contains the Processor Interface (PIF) and Configuration Control, including the following functions: Writing Registers for configuring each functional block; Reading Registers for error/status of each functional block; Configuring Diagnostic/Test Features; Monitoring Diagnostic/Test Results; Configuring Link Participant Status; and Generating Alarm Interrupts.

Figure 3:
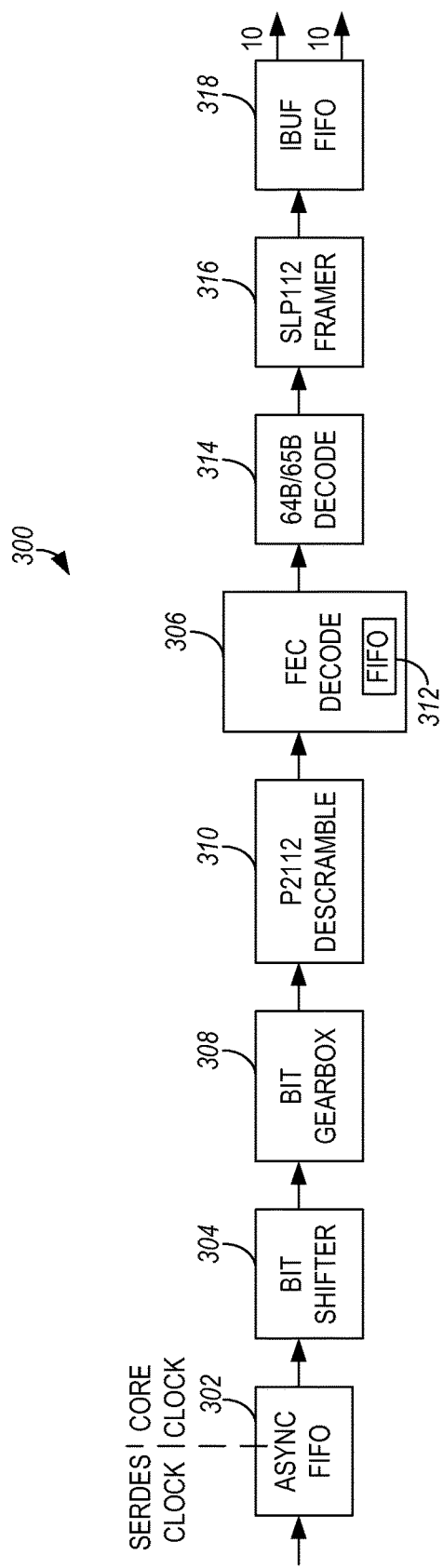
FIG. 3 is a flow diagram of data flow through a frame input engine to the switch engine of FIG. 2.

Referring to FIG. 3, in an exemplary embodiment, a flow diagram illustrates data flow 300 through the FIE 208. As described herein, the present invention may include link encoding of switch frames by mapping 8B10B control characters into an 64B65B format (similar to Generic Framing Protocol-Transparent (GFP-T)), wrapping 32 65B encoded words with an 11-bit error correcting code, and scrambling the frame with a frame synchronous scrambler. The present invention improves the bandwidth efficiency of the link encoding across the backplane and only requires a 3.125% increase in frequency (where 8B10B encoding requires a 25% frequency increase). Furthermore, the use of 64B65B link encoding (similar to GFP-T encoding) allows any character to be sent as a control character. The Switch Link Protocol uses control characters inside the switch frame for 'byte-stuffing' and framing within a timeslot. The 64B65B encoding used for 10 GbE does not allow control characters inside a packet. Using the present invention, the switch frame can maintain the framing for the collection of timeslots while allowing each timeslot to have its own framing. The link encoding uses a truncated pseudo-random-bit-sequence with a seed value chosen to balance 1's and 0's and to eliminate trouble patterns. Using a frame synchronous truncated PRBS pattern eliminates the error propagation issues encounters when using a self-synchronous scrambler. The link encoding also incorporates a Fire code that is capable of correcting an error burst of up to 11 bits for each 2112-bit FEC frame. For example, the Fire code may be the systems and methods described in commonly assigned U.S. patent application Ser. No. 12/017,629, filed Jan. 22, 2008, and entitled "SYSTEMS AND METHODS FOR EFFICIENT PARALLEL IMPLEMENTATION OF BURST ERROR CORRECTION CODES," the contents of which are herein incorporated by reference.

The data flow 300 receives input bits at an asynchronous FIFO 302 that is split between the SERDES clock and a core clock. Bit shifter 304 logic is used to determine where the d[0] data bit of the switch frame is located in the incoming data stream. The bit shift function receives feedback from FEC decode logic 306 which indicates a bit shift of the block starting point is necessary. An arbitrary bit position is chosen to start block alignment. If the FEC block does not detect good alignment it signals to the bit shifter 304 to shift the starting bit one position. The current starting bit position is held for the number of cycles it takes to compute the syndrome of the block. Once block alignment has been achieved, the starting bit position is locked in until an out of alignment condition indicates realignment is necessary. If the FEC decode 306 logic signaled the bit shifter that realignment is necessary, the starting bit position is moved forward by one bit. A gearbox block 308 translates the data bus from the async FIFO 302 block into the data width utilized by the FEC decode 306 logic. The FEC frame includes 32 payload fields and the 32-bit Fire code parity bits.

After a link is configured and enabled, the frame alignment is rotated until FEC Block Alignment is found. When the FEC blocks are being properly decoded, the Link Receive Engine searches for the Start of Switch Frame control sequence. The FEC decoder 306 is used to synchronize with the encoded block using the synchronize by-syndrome method. The qualification process starts at an arbitrary bit position, descrambles the block, and computes the FEC syndrome of the block. If no errors are found the syndrome will be zero. If a non-zero syndrome is computed, the decoder shifts the starting bit position by one bit and repeats the test. In order to account for pipeline delays, the alignment state machine will test a particular alignment for two FEC blocks before bit slipping. As a result, the FEC block alignment should take no more than 2×2112 blocks to synchronize. FEC alignment is achieved when n blocks have been received with a zero syndrome. Once FEC alignment is established, the Start of Switch Frame (SSF) sequence is looked for. For initial link qualification, both 65-bit words in the SSF pattern must be correct for two consecutive frames. After SSF framing is established, the link asserts that it is qualified and waits for the Switch Control logic to declare the link a participant. Links that do not receive their SSF within a qualifying window are disqualified and not allowed to participate in the switch frame. If loss of alignment occurs, the bit shift logic will increment by one bit position until realignment is established.

The switch frame may be scrambled with a pseudo-noise sequence. This is necessary to ensure DC-balance, ensure sufficient transition density, and to ensure FEC block synchronization, i.e. so does not falsely synchronize to a shifted version of the codeword. Input link data is descrambled 310 prior to FEC decoding. The scrambling is across all bits of the input link FEC block including the 32-bit Fire code parity bits. The output of the scrambler is XOR'd with the input data stream. The pseudo-noise sequence is seeded with a constant pattern at the beginning of the frame and persists until the end of the frame through the parity bits. Frames may be scrambled with a frame synchronous linear feedback shift register (LFSR) scrambler. The scrambler output is applied to all bits of the FEC frame. At the start of the FEC frame, the scrambler is initialized with a seed value selected to provide DC balance across the scramble pattern. Before each FEC block (encoding or decoding) the scrambler is initialized with this state.

The FEC decoder 306 is used to synchronize with the encoded block, detect errors within blocks, and correct errors. A 32-bit Fire code is capable of correcting a single burst error of up to 11-bits. The number of correctable blocks and the number of uncorrectable errors is recorded. The FEC decoder 306 is continuously decoding FEC frames when the link is enabled. If the FEC framer receives m consecutive frames with non-zero parity, the link is declared out of frame. When the out of frame condition occurs, the FEC framer will begin to hunt for the new FEC Frame Alignment location. The FEC Framer increments 1-bit locations from the current frame location, descrambles the frame and computes the Fire Code Parity. If after receiving 2112* (N+1) bits, n frames with zero parity are not found, the framer steps to the next bit location and starts the procedure over again. A FEC FIFO 312 buffers input data while the decoder 306 determines which corrections are necessary. Output data is read out of the FIFO 312 after the last word of the FEC frame has been received and all decoding calculations are complete (121+N cycles for processing).

The data flow 300 uses a 64B/65B transcoding method similar to the method used for Transparent Generic Framing Protocol, GFP-T (ITU-T G.7041), with a 64B/65B decode block 314. Eight bit data characters and up to 16 control characters are mapped into 64B/65B blocks as show in the table below. The Flag/Transcode Bit indicates whether the block contains only 8-bit data characters or whether control characters are also present.

| Frame Index | Field Description |
|---|---|
| 0:15 | SSF |
| 16:23 | CRC/CTS |
| 24:471 | ETSG 0 |
| 472:919 | ETSG 1 |
| 920:1367 | ETSG 2 |
| 1368:1815 | ETSG 3 |
| 1816:2263 | ETSG 4 |
| 2264:2711 | ETSG 5 |
| 2712:3159 | ETSG 6 |
| 3160:3607 | ETSG 7 |
| 3608:4055 | ETSG 8 |
| 4056:4503 | ETSG 9 |
| 4504:4951 | ETSG 10 |
| 4952:5399 | ETSG 11 |
| 5400: | Idle (variable length) |

The data flow utilizes a SLP112 (Switch Link Protocol 112 time slots) frame through a framer 316. The SLP112 frame includes 12 Extended Time Slot Groups (ETSG). Each ETSG includes 112 time slots, numbered in transmission order from 0 to 111. Each timeslot includes four consecutive bytes (32 bits), which are part of the same channel. Since an ETSG includes 112 four-byte timeslots, it is 448 bytes long. Each SLP112 frame carries 48 bytes per

| Input Characters | Flag Bit | 64-bit (8 Octet) Field | | | | | | |
|---|---|---|---|---|---|---|---|---|
| All Data | 0 | D1 | D2 | D3 | D4 | D5 | D6 | D7 | D8 |
| 7 Data, 1 Control | 1 | 0 aaa C1 | D2 | D3 | D4 | D5 | D6 | D7 | D8 |
| 6 Data, 2 Control | 1 | 1 aaa C1 | 0 bbb C2 | D3 | D4 | D5 | D6 | D7 | D8 |
| 5 Data, 3 Control | 1 | 1 aaa C1 | 1 bbb C2 | 0 ccc C3 | D4 | D5 | D6 | D7 | D8 |
| 4 Data, 4 Control | 1 | 1 aaa C1 | 1 bbb C2 | 1 ccc C3 | 0 ddd C4 | D5 | D6 | D7 | D8 |
| 3 Data, 5 Control | 1 | 1 aaa C1 | 1 bbb C2 | 1 ccc C3 | 1 ddd C4 | 0 eee C5 | D6 | D7 | D8 |
| 2 Data, 6 Control | 1 | 1 aaa C1 | 1 bbb C2 | 1 ccc C3 | 1 ddd C4 | 1 eee C5 | 0 fff C6 | D7 | D8 |
| 1 Data, 7 Control | 1 | 1 aaa C1 | 1 bbb C2 | 1 ccc C3 | 1 ddd C4 | 1 eee C5 | 1 fff C6 | 0 ggg C7 | D8 |
| All Control | 1 | 1 aaa C1 | 1 bbb C2 | 1 ccc C3 | 1 ddd C4 | 1 eee C5 | 1 fff C6 | 1 ggg C7 | 0 hhh C8 |

As shown in the table, for 64B/65B Transcoding, a one in the transcode/flag bit indicates that the 8-octet data field contains one or more control characters. Control characters are located at the beginning of the 64-bit payload block. The first bit of the control character contains the Last Control Character (LCC) flag bit where a zero indicates that this is the last control character. A one in the LCC bit indicates that there is another control character in the next octet. The next three bits contains the control code locator (CCL). This bit field indicates the original location of the control character with the set of eight octets. Finally, the last 4 bits of the control octet contains a 4-bit representation of the control code. The 64B/65B data within the FEC Block contains the data and control characters that make up the Switch Frame. The Switch Frame begins and ends on an encoded 65B word boundary to minimize the impact of bit errors on the Switch Frame Synchronization Sequence. The SLP112 Switch Frame is 5400 characters large, with a variable length IDLE region between switch frames, as illustrated in the following table. The FIE framer must remove the idle pattern between SLP112 frames.

channel, and 112 channels. The 112 time slots form 112 independent data streams that can be switched to any output link on the switch engine 200. Control characters are passed through including null value characters when no information is being sent; First byte of 10B idle sequence; etc. The Start of Switch Frame (SSF) consists of two 65B-encoded words. One of the two 65-bit patterns in the SSF must be decoded correctly to identify the start-of-frame. For initial link qualification, both 65-bit words in the SSF pattern must be error free for two consecutive frames. Once obtained, link qualification is only lost if: The link is disabled, or FEC alignment is lost.

Each switch frame contains a 32-bit CRC over the Time Slot Group (TSG) bytes of the previous frame. This CRC is located in bytes 16 to 19 of the SLP112. At the end of the frame the CRC-32 value is stored for insertion in the next frame. The Configuration Table Select (CTS) field contains the configuration table Bank Number used on the subsequent switch frame. The CTS field is located in byte 20. The field contains the pattern 0x00 to select bank 0 and 0xFF to select bank 1 switch configuration.

Each FIE block contains an input FIFO buffer IBUF 316. This FIFO compensates for skew between switch frames.

Input data is stored in the FIFO after input processing (synchronization, decode, and descrambling). Read of the FIFO is controlled by switch frame launch control logic. Reading of the IBUF 316 FIFO is continuous until the end of a switch frame. Reading commences again at the next switch frame launch. IBUF read data from each input link IBUF is fanned out to all 32 switch engine blocks. Links that are unqualified will transmit Null characters (control character 0x9C) to the switch engine blocks. When the Start of Switch Frame (SSF) reaches a specified depth in the FIFO, the IBUF 316 signals to the SCM 212 module that it ready for switch frame launch. For a link to participate in a switch frame, five conditions must all be met at the time the frame launch occurs (whether the launch is a consequence of autolaunch or external launch): The link is enabled; The link is qualified (i.e. FEC and framing have been established); The start-of-frame ETSG is at the head of the FIFO; The minimum threshold has been reached; The maximum threshold has not been reached.

If a link fails to participate in a launch, an error is raised, and the IBUF 316 is flushed, and held in an inactive state until the next start-of-frame ETSG is received. The IBUF 318 FIFO is 256 locations deep by 36 bits wide. Each FIFO word includes four 8-bit data words with 1 control bit each. The control bit indicates if the 8-bit byte contains a control character. The IBUF 318 provides approximately 1.35 microseconds of jitter buffer into the IMUX fabric. The IBUF 318 is flushed and held in an inactive state when the channel is disabled.

Figure 4:
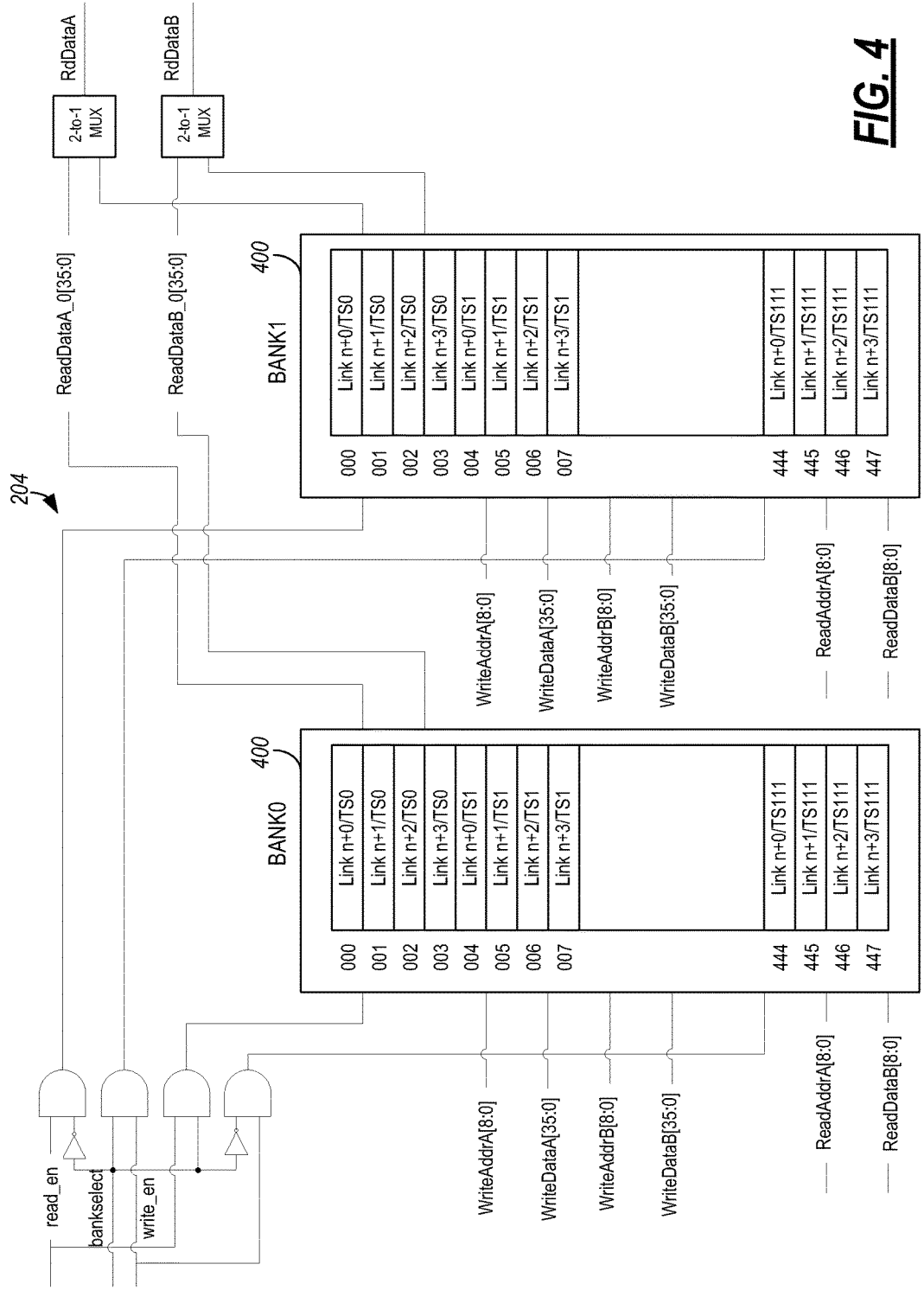
FIG. 4 is a diagram of Memory Tile bankram organization for the cascadable time-space switch building block of FIG. 7.
Figure 7:
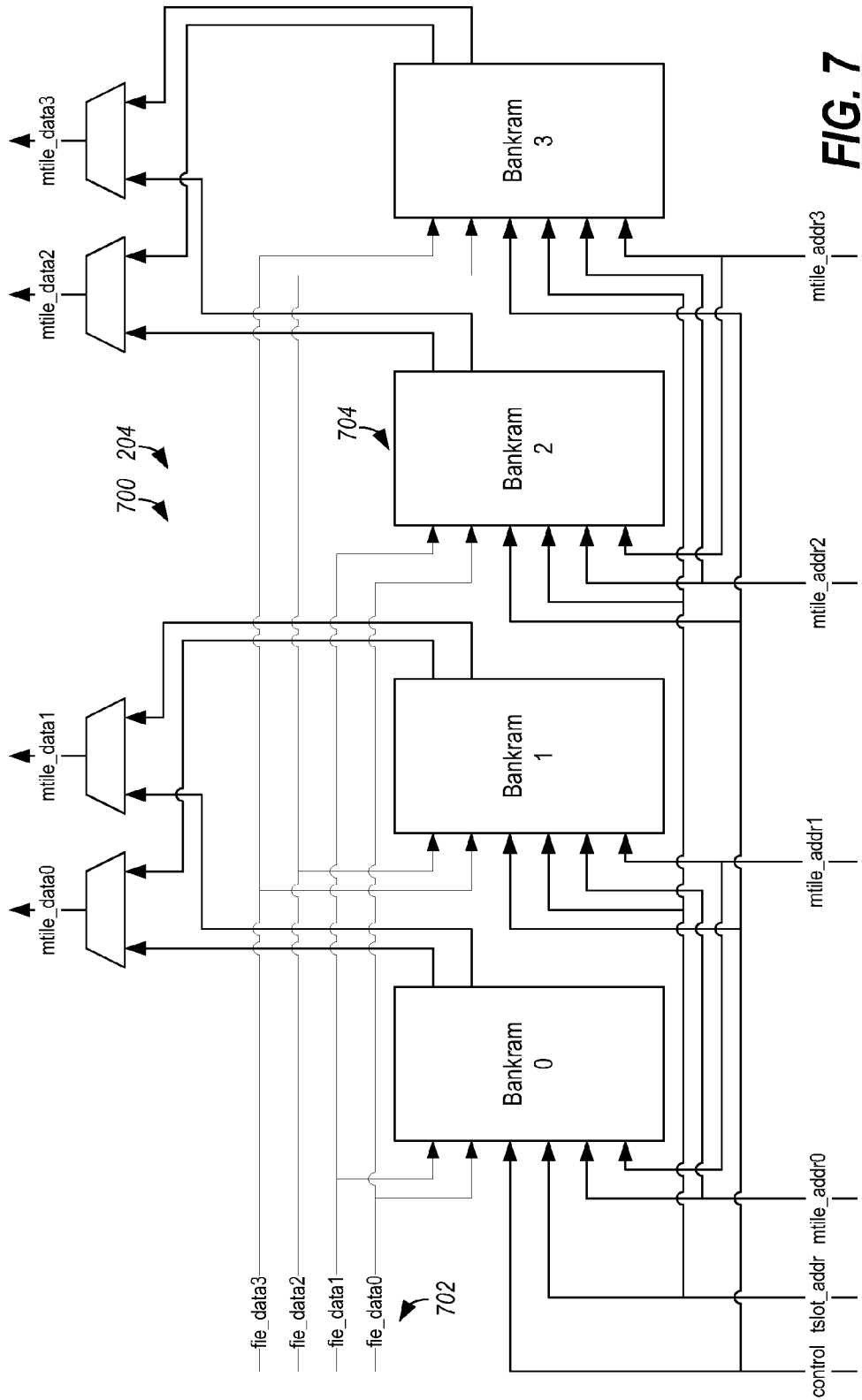
FIG. 7 is a diagram of bankram instantiation within a Memory Tile, with the data muxing and pipeline direction for the switch engine of FIG. 2.

Referring to FIG. 7, in an exemplary embodiment, a diagram illustrates MTile 204 organization. Referring to FIG. 4 in an exemplary embodiment, a diagram of timeslot organization within a bankram 400. Each bankram 704 has 2-Read Ports and 2 Write Ports with data from two links multiplexed into a single write port. Each bankram 400 memory holds timeslot data from four (4) links. While timeslot data from the current frame is being written to one bank, timeslot data from the previous frame may be read from the other bank. When all timeslots have been written into the bankram 400 memory, the read bank and write banks are swapped. The MTile Bankram 400 contains enough storage to store two banks of 112 Time Slots from 4 input links. The MTile Bankram 400 memory is organized as two blocks or banks, each of which can store a complete set of ETSG. At any one time one of these blocks is being written with new ETSG data while the other block is being read. At each ETSG boundary the blocks switch roles. Each input link sends one 36-bit word every other clock cycle. Even and odd link pairs are multiplexed into a single data stream which is written into one of the write ports of a bankram. Each of the bankrams 400 has two independent read/write ports and holds one ETSG of timeslot data for four (4) input links. On read cycles, the bankram 400 supplies the output data for a timeslot if the link address matches any of the 4 links stored in the bankram.

Figure 5:
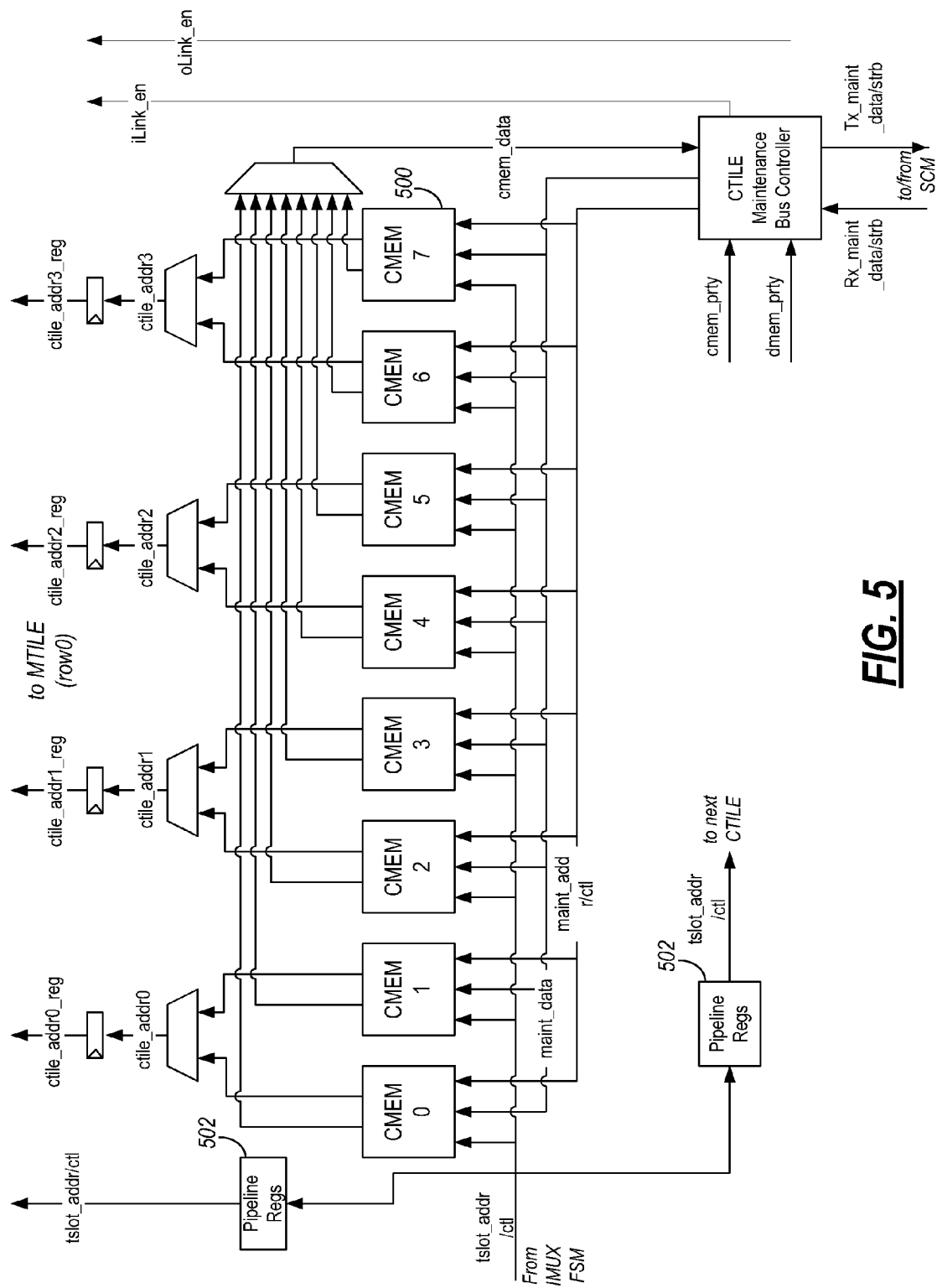
FIG. 5 is a diagram of Configuration Tile 202 organization for the switch engine of FIG. 2.

Referring to FIG. 5, in an exemplary embodiment, a diagram illustrates CTile 202 organization. The Configuration Tile (Ctile) 202 contains configuration memories 500 for eight links. Pipeline registers 502 are placed between the tiles 202 so that interconnection between adjacent blocks is required. The Configuration memory 500 stores two complete sets of Link/Timeslot indicators for each output timeslot, or 224 Link/Timeslot indicators. The Configuration memory 502 requires a Read/Write port for maintenance access and a Read port for operation. The Configuration memory 500 includes two banks, each of which holds a complete set of Link/Timeslot indicators for each output timeslot, or 112 indicators. One of these banks is the active bank while the other is inactive. The usual mode of operation is for all operational reads to be made to the active bank, while the inactive bank is configured by maintenance. The switch configuration table is 224 entries long (2 banks of 112), each entry being 13 bits wide as illustrated in the following table:

| Bits | Field Description |
| --- | --- |
| 12 | Parity (hardware generated) |
| 11:7 | Ingress Link Select [4:0] |
| 6:0 | Ingress Time Slot Select [6:0] |

Software must ensure that the configuration table has been programmed before enabling output links. Unused links are recommended to have all table entries programmed to 0x70 at start-up to force NULL characters if enabled inadvertently. A group of eight Configuration Memories 500 is collected into a CTile 202, as shown in FIG. 5. The four CTiles 202 in the switch engine 200 are pipelined to reduce fan-out and long net lengths. Each CTile 202 is uniquely addressed to provide read/write access to the CMEM memories and control bits.

Figure 6:
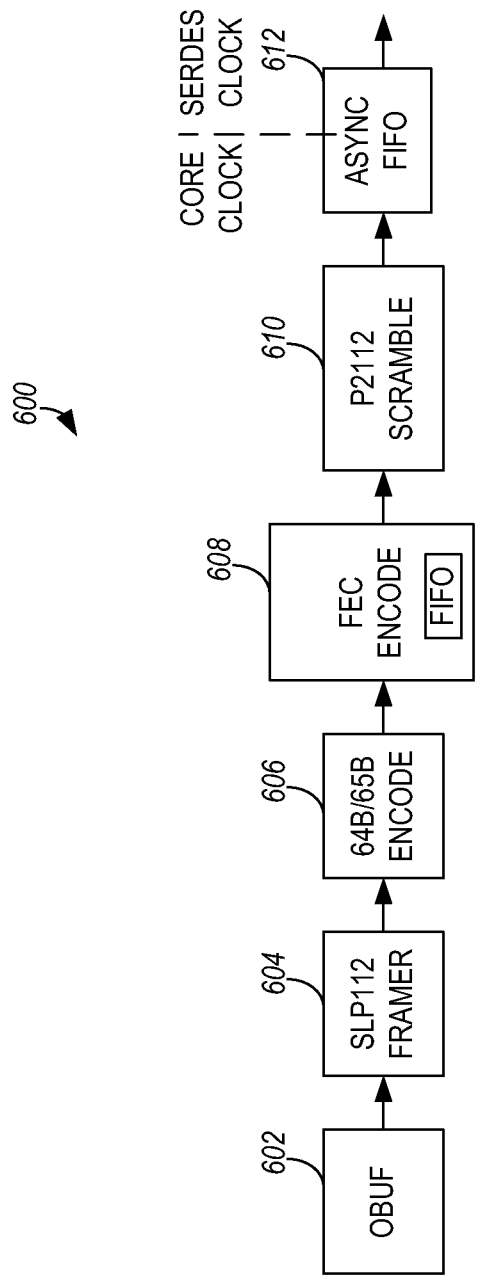
FIG. 6 is a flow diagram of data flow through a frame output engine to the switch engine of FIG. 2.

Referring to FIG. 6, in an exemplary embodiment, a flow diagram illustrates data flow 600 through the FOE 206. The FOE 206 are configured to reinsert start-of-switch-frame characters; generate SLP112 switch frames—perform 65B encoding of 64B data, insert CRC, and Firecode encoding; perform scrambling; generate IDLE sequences between frames; and the like. An Output Buffer (OBUF) 602 is a buffer designed to buffer match the data rate from the switch engine 200 (a constant 6 Gbps) to the data rate of the FOE 206. An output SLP112 604 framer recreates SLP112 switch frame format as described herein. The Start of Switch Frame characters are inserted into the first two bytes of the frame. The CRC for the previous frame is inserted and the CTS bytes are inserted. A 64B/65B encoder block 606 re-encodes 64-bit data into 65-bit payload blocks by reinserting the transcode/flag bit. A FEC encoder 608 encodes 32 65-bit code words using a (2112, 2080) systematic code. The code is a shortened cyclic Fire code. The 32 parity bits is appended to the data bits and scrambled before transmission. The link switch frame is scrambled by a scrambler 610 with the pseudo-noise sequence. The pseudo-noise sequence is seeded with a constant pattern at the beginning of the frame and persists until the end of the frame through the parity bits. Frames are scrambled with a frame synchronous LFSR scrambler. The scrambler output is applied to all bits of the FEC frame. The FOE 206 controls a transmit async FIFO 612 in Tx SLMs 214 (FIG. 2) that is responsible for synchronizing output link data from the core clock domain to the serdes clock domain.

Referring to FIG. 7, in an exemplary embodiment, a diagram illustrates MTile 204 pipelining 700. In this diagram, input data 702 is flowing from left to right. Output timeslot data and switch addressing and control 704 flows from the bottom to the top. A Mtile Core block 706 includes four bankrams as shown in FIG. 7. Each Mtile 204 provides sufficient memory, multiplexing, and logic to support an 8-by-8 link time-space switch. A larger switch can be created using multiple Mtile blocks; an 8N-by-8N link time-space switch can be built using $N^2$ Mtile blocks. The Mtile blocks are pipelined to reduce fan-out and long nets when a larger switch is constructed. Notice that the Mtile blocks only need to communicate with adjacent blocks.

Figure 8:
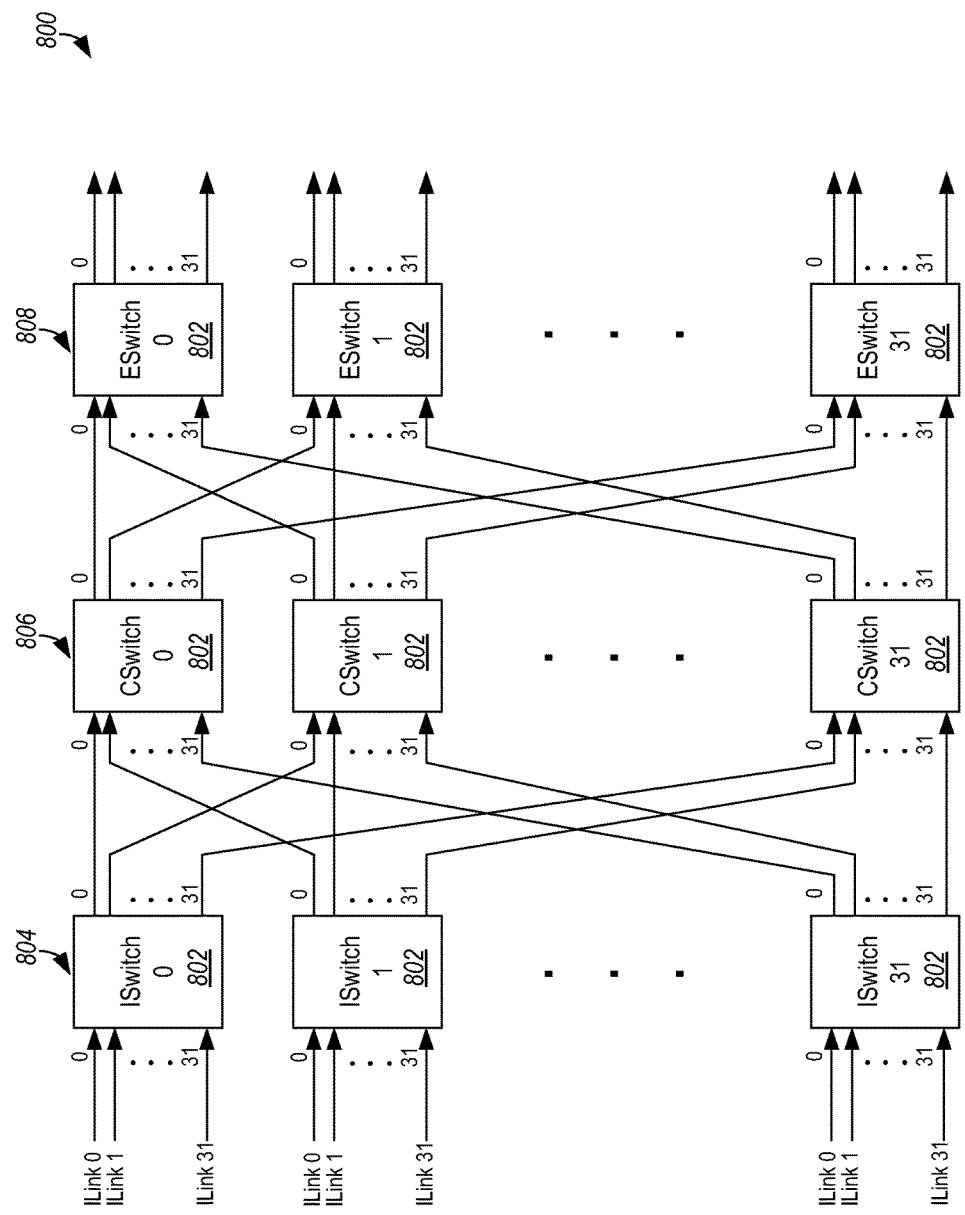
FIG. 8 is a diagram of a three-stage switch utilizing a plurality of switching devices, such as the switches in FIGS. 1 and 2.

Referring to FIG. 8, in an exemplary embodiment, a diagram illustrates a three-stage switch 800 utilizing a plurality of switching devices 802. Each of the switching devices 802 may include the switch matrix 100 or the switch engine 200. The three-stage switch 800 is a Clos switch architecture with an Ingress Switch (ISwitch) 804, a Center Switch (CSwitch) 806, and an Egress Switch (ESwitch) 808. Each of the ISwitch 804, CSwitch 806, and ESwitch 808 may include a switching device, such as the switch matrix 100 or the switch engine 200. Note, the switch matrix 100 and the switch engine 200 are configured to operate in any of these three modes, i.e. ISwitch 804, CSwitch 806, and ESwitch 808. In this configuration, each of the switching devices 802 is a 32×32 device.

Figure 9:
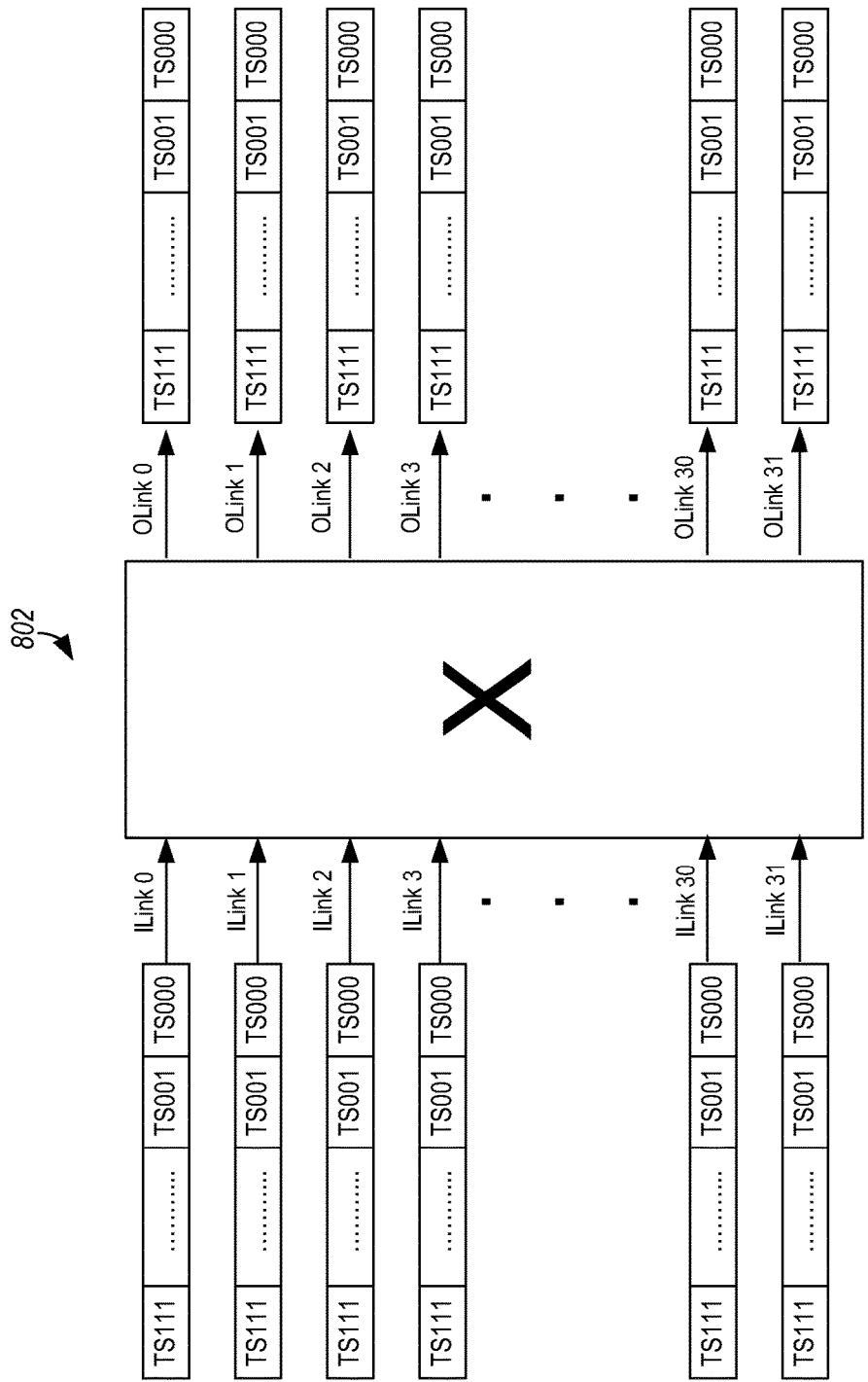
FIG. 9 is a diagram of the time-space view of timeslots going into and out of any of the plurality of switching devices of FIG. 8.

Referring to FIG. 9, in an exemplary embodiment, a diagram illustrates functionality of the switching devices 802. Each input and output link to the switching device 802 carries encoded SLP112 frames at a serial data rate of 6.25 Gbps. There are 32 embedded SerDes macros on the switching device 802 that handle receive clock recovery, serial-to-parallel and parallel-to-serial conversion functions. The switching device 802 can switch up to 112 time slots on each of the 32 time multiplexed input data links to any of the 112 time slots on each of the 32 time multiplexed output data links. Logically, the switching device 802 can be viewed as a non-blocking 3584×3584 timeslot switch matrix. Each of the 3584 timeslots supports as much as 52 Mbps of bandwidth, thereby enabling the switching device 802 to support an aggregate bandwidth of approximately 180 Gbps. The generic switching device 802 can be configured to operate in ingress, egress, or center stage modes for multistage architectures. Communication to the switching device 802 is via a dedicated processor interface. Its features include: 32 embedded 6.25 Gbps SERDES data channels; SLP112 framing; Configurable 3584×3584 combination time slot interchange and spatial switch; Dual configuration bank for hitless switch-over; Configurable for multistage switch designs; Dedicated processor interface; External switch frame launch; In-band configuration table select through majority voting; and Error checking and reporting of CRC, Fire Code Corrected Errors and Uncorrectable errors, switch frame integrity, configuration table select, loss of signal, loss of alignment, IBUF overflow/underflow.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A pipelined time-space switch, comprising:
input circuitry comprising N input links each receiving M timeslots of data, wherein N and M are integers;
a two-dimensional matrix of a plurality of timeslot interchangers, wherein the two-dimensional matrix is configured to receive from the input circuitry each of the M timeslots from the N input links in a pipelined manner where each of the plurality of timeslot interchangers interconnect to adjacent neighbors only;
output circuitry comprising N output links configured to receive any of the M timeslots from any of the N input links from the two-dimensional matrix;
wherein the input circuitry is located orthogonal to the output circuitry and each of the input circuitry and the output circuitry are adjacent to the two-dimensional matrix; and
wherein input data flows from the input circuitry orthogonal to the output circuitry, and wherein output data and control flows to the output circuitry orthogonal to the input circuitry; and
common control circuitry parallel to the input circuitry, wherein the common control circuitry is communicatively coupled to separate configuration memories for each of the N output links parallel to the output circuitry, wherein the configuration memories are configured to control the data flow to the output circuitry for their respective output links, wherein the configuration memories are directly coupled to a first column of the plurality of timeslot interchangers and not directly coupled to other columns of the plurality of timeslot interchangers, wherein addressing from the configuration memories is pipelined through the two-dimensional matrix, and wherein the common control circuitry, for providing launch signals with the addressing to the two-dimensional matrix, is connected to the input circuitry and the configuration memories,
wherein the input circuitry and the output circuitry respectively comprise input framers and output framers which utilize efficient line coding relative to 8B10B, comprising of SLP112 timeslot data framing, 64B65B encoding, Fire code forward error correction, and scrambling.

2. The pipelined time-space switch of claim 1, wherein the pipelined manner provides interconnect complexity that does not grow as spatial dimension is increased and results in a reduction of long high fan-out nets.

3. The pipelined time-space switch of claim 1, wherein the input circuitry comprises input framers for each of the N input links; and wherein the output circuitry comprises output framers for each of the N output links.

4. The pipelined time-space switch of claim 1, wherein each of the plurality of timeslot interchangers comprises of 8×8 link cascadable time-space switches.

5. The pipelined time-space switch of claim 1, wherein the pipelined time-space switch is configurable as one of an ingress switch, a center stage switch, and an egress switch.

6. A pipelined time-space switch, comprising:
input circuitry comprising N input links each receiving M timeslots, wherein N and M are integers;
a two-dimensional matrix of a plurality of time-space switches, wherein the two-dimensional matrix is configured to receive from the input circuitry each of the M timeslots from the N input links in a pipelined manner where each of the plurality of time-space switches interconnect to adjacent neighbors only; and
output circuitry comprising N output links configured to receive any of the M timeslots from any of the N links from the two-dimensional matrix;
wherein the input circuitry is located orthogonal to the output circuitry and each of the input circuitry and the output circuitry are adjacent to the two-dimensional matrix; and
wherein input data flows from the input circuitry orthogonal to the output circuitry, and wherein output data and control flows to the output circuitry orthogonal to the input circuitry; and
common control circuitry parallel to the input circuitry, wherein the common control circuitry is communicatively coupled to separate configuration memories for each of the N output links parallel to the output circuitry, wherein the configuration memories are configured to control the data flow to the output circuitry for their respective links, wherein the configuration memories are directly coupled to a first column of the plurality of time-space switches and not directly coupled to other columns of the plurality of time-space switches, wherein addressing from the configuration memories is pipelined through the two-dimensional matrix, and wherein the common control circuitry, for providing launch signals with the addressing to the two-dimensional matrix, is connected to the input circuitry and the configuration memories, wherein the input circuitry comprises input framers for each of the N input links; wherein the output circuitry comprises output framers for each of the N output links; and wherein the input framers and the output framers utilize efficient line coding relative to 8B10B, comprising of SLP112 timeslot data framing, 64B65B encoding, Fire code forward error correction and scrambling.

7. The pipelined time-space switch of claim 6, wherein the pipelined manner provides interconnect complexity that does not grow as spatial dimension is increased and results in a reduction of long high fan-out nets.

8. The pipelined time-space switch of claim 7, wherein each of the plurality of time-space switches comprises a memory tile configured to operate as an 8×8 time-space switch.

9. The pipelined time-space switch of claim 8, wherein the pipelined time-space switch comprises $N^2$ of the memory tiles interconnected in the pipelined manner thereby providing an overall 8N×8N link time-space switch, where N is an integer.

10. The pipelined time-space switch of claim 6, wherein the pipelined time-space switch is configurable as one of an ingress switch, a center stage switch, and an egress switch.

11. A pipelined time-space switching method, comprising:
receiving M timeslots over each of N input links, N and M are integers;
loading each of the M timeslots for each of the N input links in a two-dimensional matrix in a pipelined fashion where interconnections in the two-dimensional matrix are only between adjacent neighbors only;
reading out any of the M timeslots from any of the N output links from the two-dimensional matrix;
wherein input circuitry receiving the M timeslots is located orthogonal to output circuitry reading out the any of the M timeslots and each of the input circuitry and the output circuitry are adjacent to the two-dimensional matrix; and
providing common control circuitry parallel to the input circuitry, wherein the common control circuitry is communicatively coupled to separate configuration memories for each of the N output links parallel to the output circuitry, wherein the configuration memories are configured to control the data flow to the output circuitry for their respective links, wherein the configuration memories are directly coupled to a first column of the two-dimensional matrix and not directly coupled to other columns of the two-dimensional matrix, wherein addressing from the configuration memories is pipelined through the two-dimensional matrix, and wherein the common control circuitry, is connected to the input circuitry and the configuration memories,
wherein the input circuitry and the output circuitry respectively comprise input framers and output framers which utilize efficient line coding relative to 8B10B, comprising of SLP112 timeslot data framing, 64B65B encoding, Fire code forward error correction, and scrambling.

12. The pipelined time-space switching method of claim 11, wherein the pipelined fashion provides interconnect complexity that does not grow as spatial dimension is increased and resulting in a reduction of long high fan-out nets.

* * * * *